United States Patent [19]
Haines et al.

[11] 4,448,911
[45] May 15, 1984

[54] AQUEOUS EPOXY SIZING COMPOSITION FOR GLASS FIBERS AND FIBERS SIZED THEREWITH

[75] Inventors: Richard M. Haines, Warsaw; Robert Wong, Granville, both of Ohio

[73] Assignee: Owens-Corning Fiberglas Corporation, Toledo, Ohio

[21] Appl. No.: 484,124

[22] Filed: Apr. 12, 1983

[51] Int. Cl.$^3$ .................... B32B 17/10; C08L 39/06; C08L 91/00
[52] U.S. Cl. .................... 523/411; 428/378; 523/402; 523/425
[58] Field of Search .................... 523/411, 402, 425; 428/378

[56] References Cited

U.S. PATENT DOCUMENTS

| | | | |
|---|---|---|---|
| 3,223,577 | 12/1965 | Plueddemann | 161/193 |
| 3,395,069 | 7/1968 | Plueddemann | 161/193 |
| 3,437,517 | 4/1969 | Eilerman et al. | 428/378 |
| 3,441,585 | 4/1969 | Brown | 556/405 |
| 3,478,077 | 11/1969 | Wo | 556/465 |
| 3,654,332 | 4/1972 | Berger | 556/465 |
| 3,772,870 | 11/1973 | Wong | 523/411 |
| 3,837,898 | 9/1974 | McCombs et al. | 428/378 |
| 3,850,869 | 11/1974 | Mohr | 428/378 |
| 4,140,833 | 2/1979 | McCoy | 523/411 |
| 4,305,742 | 12/1981 | Barch et al. | 106/238 |
| 4,330,444 | 5/1982 | Pollman | 428/378 |
| 4,346,026 | 8/1982 | Wong et al. | 524/157 |
| 4,361,465 | 11/1982 | Graham | 428/378 |
| 4,369,264 | 1/1983 | Baumann et al. | 428/378 |
| 4,394,475 | 7/1983 | Temple et al. | 428/378 |

*Primary Examiner*—Ronald W. Griffin
*Attorney, Agent, or Firm*—Ronald C. Hudgens; Greg Dziegielewski; Philip R. Cloutier

[57] ABSTRACT

Aqueous sizing compositions for glass fibers having emulsified epoxy resin as film-former, emulsified mineral oil as lubricant, glycidoxyalkyl and/or haloalkylsilanes as coupling agents, amide anti-static agent and polyvinylpyrrolidone give superior properties, especially where the sized glass fibers are used as reinforcement in epoxy resin articles, when reduced proportions of predominantly anionic surfactants are used to co-emulsify the epoxy resin film-former and the mineral oil.

11 Claims, No Drawings

AQUEOUS EPOXY SIZING COMPOSITION FOR GLASS FIBERS AND FIBERS SIZED THEREWITH

FIELD OF THE INVENTION

This invention relates to the field of aqueous compositions for sizing glass fibers, and especially of such compositions containing epoxy resins, and of glass fibers sized therewith.

BACKGROUND OF THE INVENTION

Glass fibers intended for incorporation as reinforcing elements in articles fabricated from various matrix materials, such as polymeric as resinous materials, are usually provided with a light-weight size coating to protect the fibers from damage by abrasion during processing and fabrication and/or to enhance the reinforcing interaction between the fibers and the matrix material. Such size coatings typically comprise a film-forming polymeric or resinous component, a lubricant and a glass-resin coupling agent such as a partially hydrolyzable organosilane or hydrolysate thereof.

Such size coatings are usually deposited on the glass fibers during their production, which is ordinarily by attenuation of a plurality of streams of molten glass issuing from a reservoir through a corresponding plurality of orifices in a so-called bushing and solidification of the attenuated filaments by cooling. The coating is typically applied to the fibers as a liquid solution or dispersion in a volatile medium, from which the ultimate size coating is deposited on the fibers by evaporation of the medium and any other volatile components either before or after the fibers have been collected into a package as by winding onto a suitable collet.

Among the film-forming components of sizing compositions that have been employed are epoxy resins, especially where the fibers are to be used for reinforcing articles made from epoxy resins, such as by winding essentially continuous multi-filament glass fiber strands about a suitable form and impregnating with a curable resin composition and then curing the matrix resin to produce a glass fiber reinforced article such as a pipe or a tank. Both dilute solutions containing epoxy resin film-formers in volatile solvents such as diacetone alcohol and dilute emulsions of epoxy resin film-formers in aqueous media have been employed as sizing compositions for glass fibers. The use of large proportions of volatile organic solvents has disadvantages in that they are expensive and require careful handling during both use and disposal to avoid health and fire hazards. On the other hand, the use of aqueous media for the ordinary types of epoxy resins, i.e., those which have not been specially modified to render them soluble therein, requires that surfactants be employed to emulsify the epoxy resin and the surfactants employed are usually both non-volatile and detrimental to the properties of the ultimate reinforced article.

It is a principal advantage of the present invention that sizing compositions ae formulated as dilute emulsions of epoxy resin in aqueous media with reduced proportions of surfactants so as to avoid the disadvantages of using solvent-based sizing compositions while realizing superior properties in the ultimate reinforced articles.

SUMMARY OF THE INVENTION

In one aspect, the invention is a dilute aqueous composition suitable for sizing glass fibers which consists essentially of emulsified liquid epoxy resin or emulsified liquid solution of a major proportion by weight of epoxy resin and a minor proportion by weight of an organic solvent therefor; about 5 to about 15 percent of the weight of the epoxy resin of emulsified mineral oil; about 5 to about 12 percent of the weight of the epoxy resin of predominantly non-ionic surfactant for emulsifying the epoxy resin or solution thereof and the mineral oil; about $2\frac{1}{2}$ to about $7\frac{1}{2}$ percent of the weight of the epoxy resin of amide anti-static agent; about 2 to about 15 percent of the weight of the epoxy resin of polyvinylpyrrolidone; about 3 to about 15 percent of the weight of the epoxy resin of an organosilane coupling agent having a halogen atom or an epoxy group linked by hydrolysis-resistant bonds through at least one intervening atom to a silicon atom of said silane and also having at least two groups which are readily hydrolyzable at a silicon atom of said silane, and/or hydrolysate thereof; and water.

In another aspect, the invention is a glass fiber having as a size coating a dried residue of such an aqueous sizing composition.

In still another apsect, the invention is a resinous article reinforced with such a glass fiber imbedded in the resin matrix of the article.

DESCRIPTION OF PREFERRED EMBODIMENTS

As the epoxy resin film-forming component of the sizing composition of the invention one can use either an epoxy resin which is liquid at ordinary ambient workplace temperatures or a solution of an epoxy resin which may be either liquid or solid at such temperatures so long as the solution is liquid. The epoxy resin can be any suitable resin, but a resin having at least about 2 epoxy groups per molocule is preferred and a reaction product of a bisphenol such as bisphenol A or bisphenol F and a molar excess of an epihalohydrin such as epichlorohydrin is particularly preferred. Epoxy resins characterized by epoxy equivalent weights not greater than about 250 are especially advantageous.

If a solution of epoxy resin in a solvent is used, it should comprise a major proportion by weight of the epoxy resin. A particularly suitable solvent is diacetone alcohol, but other solvents for epoxy resins of appropriate volatility can also be used. Some of the solvent may partition into the aqueous phase of the sizing composition.

As the lubricant component of the sizing compositions of the invention mineral oil is used.

The liquid epoxy resin, or the liquid solution thereof, and the mineral oil are emulsified in the aqueous medium with predominantly non-ionic surfactants, present at reduced levels as compared to earlier practice. While any suitable predominantly non-ionic surfactants can be used, a predominantly non-ionic mixture of surfactants will be found advantageous in many circumstances. Particularly advantageous non-ionic surfactants are alkylaryloxypoly(alkoxy)alkanols, especially $C_{\geq 6}$-alkylaryloxypoly($C_{2-4}$-alkoxy)-$C_{2-4}$-alkanols such as Igepol (TM/GAF Corp.) C0210, which is a nonylphenoxypoly(ethoxy)ethanol having an HLB index of about 4.6, and Igepal C0890, which is a nonylphenoxypoly(ethoxy)ethanol having an HLB index of about 17.8, or its 70% aqueous solution, Igepol C0897, and mixtures thereof.

Minor proportions, by weight of the total surfactant system, of methylcellulose or other non-ionic surfactants can also be advantageously included, as can minor proportions by weight of anionic surfactants such as suitable sulfonic acids.

A suitable amide anti-static agent such as an amide/ester or, less advantageously, a fatty partial amide of a polyamine such as a polyalkylenepolyamine is also included in the aqueous sizing composition. While such anti-static agents are normally used where the sized glass fibers are to be chopped into short lengths prior to use, it has been found advantageous for achieving the superior results obtainable with the present invention to include this component even where the sized glass fibers are to be used as essentially continuous lengths, as in filament winding.

Any suitable polyvinylpyrrolidone can be used. A particularly suitable material is PVP-K-90 from GAF Corp. as a 22.5% aqueous solution.

As the organosilane coupling agent, any of the conventional materials, which have at least one organic group joined to a silicon atom by a hydrolysis-resistant bond such as a silicon-carbon covalent bond and also have at least two groups readily hydrolyzable at a silicon atom, can be used, but it is preferred that the hydrolysis-resistant groups contain either a halogen atom or an epoxy group and no other functional group. Especially preferred silanes are haloalkylsilanes such as 3-chloropropyltrimethoxysilane and glycidoxyalkylsilanes such as 3-glycidoxypropyltrimethoxysilane. Mixtures of suitable silanes can be used advantageously. It is preferred that the organosilanes be at least partially hydrolyzed.

While the proportions of the various components are not narrowly critical, the best results should be expected if the following proportions are substantially adhered to. Since some of the advantages provided by the invention derive at least in part from using lower than usual proportions of surfactants for emulsifying the epoxy resin or solution thereof and the mineral oil, it is important that the upper limits of the surfactant ranges not be exceeded if such advantages are to be successfully realized.

| Component | Approx. Percent by Weight | |
|---|---|---|
| | Of Total | Of Epoxy Resin |
| Epoxy resin | 1-10 | |
| Solvent | | 0-100 |
| Mineral oil | | 5-15 |
| Surfactant(s) | | 5-12 |
| Anti-static | | 2½-7½ |
| PVP | | 2-15 |
| Silane | | 3-15 |
| Water | | Balance |

The dilute sizing compositions of the invention are advantageously prepared by first preparing a relatively concentrated aqueous co-emulsion of the liquid epoxy resin or liquid solution of epoxy resin and at least a portion of the mineral oil using at least a portion of the surfactant and the anti-stat, but otherwise employing conventional procedures.

Suitable concentrated aqueous emulsions useful in preparing the dilute sizing compositions of the invention can be prepared by generally conventional procedures. One particularly advantageous procedure is to first blend together the epoxy resin, solvent (if any), mineral oil, surfactant (except for methylcellulose or similar material), and amide anti-static agent to form a liquid mixture or solution. This mixture may advantageously be heated to a suitable temperature for fluidizing the mixture without excessive volatilization of the components thereof, if desired. A dilute aqueous premix of methylcellulose or similar material at about the same temperature is then slowly added to the epoxy-solvent-oil-surfactant-antistat blend with vigorous high shear agitation. Initially, a water-in-oil emulsion will form, but upon continued addition of the aqueous premix this will invert to an oil-in-water emulsion. Sufficient deionized water should then be added to achieve the desired final concentration and, if the temperature is significantly about ambient, the emulsion is mildly agitated while it is cooled to about ambient temperature.

Any suitable high shear mixing or agitating apparatus can be used.

EXAMPLE 1

A particularly advantageous concentrated emulsion for use in preparing the dilute aqueous sizing compositions of the invention has been prepared using the following formulation:

| Material | Wt. % of total emulsion |
|---|---|
| D.E.R. 330 epoxy resin | 51.02 |
| Diacetone alcohol (DAA) | 5.61 |
| Igepal CO 210 | 2.04 |
| Igepal CO 897 | 2.04 |
| Emerlube 7440 | 3.31 |
| Methocel A15LV | 0.25 |
| D.I. water | Balance to make 100 |

D.E.R. 330 (TM/Dow) is a liquid glycidyl ether-terminated bisphenol A/epichlorohydrin adduct having EEW of about 177–188. Igepal CO210 and CO897 (70% N.V.) are non-ionic surfactants identified hereinabove. Emerlube 7440 (TM/Emergy Industries) is a blend of about 40% mineral oil, about 20% amide/ester anti-stat and about 20% surfactant in about 3:1 ratio of non-ionic to anionic. Methocel A15LV (TM/Dow) is methylcellulose.

The epoxy resin, diacetone alcohol, Igepal CO210 and CO897, and Emerlube 7440 were blended together with moderate agitation by a Myers (TM) high shear mixer at ambient temperature, then heated to about 150° F. while being subjected to vigorous agitation by increasing the speed of the mixer. A premix of the methylcellulose in about 80 times its weight of de-ionized water, also at about 150° F., was then slowly added, followed by the balance of the de-ionized water, while vigorous high shear agitation was continued and the temperature maintained at about 150° F. Inversion of the emulsion occurred before all of the premix had been incorporated. The emulsion was agitated at a low speed setting of the mixer while it was cooled to about ambient temperature. The product was a stable aqueous emulsion exhibiting the characteristic bluish color of small particle emulsions.

EXAMPLE 2

A dilute sizing composition was prepared from the emulsion of Example 1 according to the following formulation:

| Ingredient | Wt. % |
| --- | --- |
| Emulsion of Ex. 1 (57% N.V.) | 12.45 |
| Emerlube 7440 | 1.00 |
| PVP-K-90 (22.5% N.V.) | 2.40 |
| 3-Glycidoxypropyltrimethoxysilane | 0.25 |
| 3-Chloropropyltrimethoxysilane | 0.25 |
| Glacial acetic acid | 0.50 |
| D.I. Water | Balance |

The acetic acid was diluted in about 90 times its weight of D.I. water and the epoxysilane was then mixed into this dilute acid and agitated for about 30 minutes to hydrolyze the silane. The emulsion of Example 1 was then diluted with about its own weight of D.I. water and added to the hydrolyzed epoxysilane mixture. The additional Emerlube 7440 and the PVP (polyvinylpyrrolidone) were then mixed together and diluted with about 2½ times their combined weight of D.I. water and then added to the main mixture.

Next, the chloropropylsilane was added to the main mixture and agitated for about 10 minutes. Finally, the balance of the water was added to the main mixture and the whole agitated for about an additional 30 minutes. The final pH was about 3.2±0.2 and the solids content was about 8.7±0.3%.

EXAMPLE 3

A second dilute sizing composition of the invention was prepared according to the formulation and procedure of Example 2 except that citric acid was substituted for acetic acid and the amount of 3-glycidoxypropyltrimethoxysilane was doubled and the 3-chloropropyltrimethoxysilane omitted. Final solids were about 8.85±0.35%.

EXAMPLE 4

A third dilute sizing composition of the invention was prepared according to the formulation and procedure of Example 2 except that the amount of 3-chloropropyltrimethoxysilane was doubled and the glycidoxypropylsilane (and its hydrolysis) were omitted. Also, the chlorpropylsilane was added to the main mix as the final addition, after the balance of the water and the acetic acid had first been added into the main mix. Final pH was about 3.2±0.2 and solids about 8.6±0.4%.

EXAMPLE 5

A more dilute sizing composition of the invention was prepared according to the following formulation:

| Ingredient | Wt. % |
| --- | --- |
| Emulsion of Ex. 1 (57% N.V.) | 4.32 |
| Emerlube 7440 | 0.56 |
| PVP-K-90 (22.5% N.V.) | 0.42 |
| 3-chloropropyltrimethoxysilane | 0.15 |
| Glacial acetic acid | 0.20 |
| D.I. water | Balance |

Final solids content was about 3.3%.

The aqueous sizing compositions of Examples 2-5 have all been applied by conventional means during fiber manufacture to both conventional E-glass fibers and to high strength fibers of S-glass (TM/Owens-Corning Fiberglas Corp.) type. With the sizing compositions of Examples 2-4, the sizing composition was applied so as to deposit a dried size coating on the fibers corresponding to about 1.7±0.3 percent of the weight of the fibers (LOI). With the more dilute sizing composition of Example 5, the dried size coating deposited on the fibers was about 0.6 percent of the weight of the fibers (LOI).

All of these sized fibers exhibited excellent handling and processing characteristics. In particular, they were found to be superior to glass fibers sized with earlier aqueous compositions having epoxy resins as film-forming components in requiring lower strand tensions during subsequent processing of the dry sized multi-filament strands, in generating less fuzz during subsequent processing, and in being more readily wet or impregnated with the liquid resin compositions, especially epoxy resin compositions, during fabrication of reinforced articles therefrom, especially by filament winding.

Furthermore, such articles and especially either amine or anhydride cured epoxy resin articles, reinforced with these glass fibers exhibited excellent physical properties. In particular, they were found to be superior to similar articles reinforced with glass fibers sized with earlier aqueous compositions having epoxy resins as fiber-forming components in shear strength and in retention of shear strength upon extended immersion in water.

Numerous variations and modifications of the invention as particularly described herein will be apparent to those skilled in the art, and are contemplated as being within the scope of the invention here described.

We claim:

1. A dilute aqueous composition suitable for sizing glass fibers which consists essentially of emulsified liquid epoxy resin or emulsified liquid solution of a major proportion by weight of epoxy resin and a minor proportion by weight of an organic solvent therefor; about 5 to about 15 percent of the weight of the epoxy resin of emulsified mineral oil; about 5 to about 12 percent of the weight of the epoxy resin of predominantly non-ionic surfactant for emulsifying the epoxy resin or solution thereof and the mineral oil; about 2½ to about 7½ percent of the weight of the epoxy resin of amide anti-static agent; about 2 to about 15 percent of the weight of the epoxy resin of polyvinylpyrrolidone; about 3 to about 15 percent of the weight of the epoxy resin of an organosilane coupling agent having a halogen atom or an epoxy group linked by hydrolysis-resistant bonds through at least one intervening atom to a silicon atom of said silane and also having at least two groups which are readily hydrolyzable at a silicon atom of said silane, and/or hydrolysate thereof; and water.

2. An aqueous composition according to claim 1 wherein the epoxy resin is present in an amount from about 1 to about 10 percent by weight.

3. An aqueous composition according to claim 1 wherein said epoxy resin has at least about 2 epoxy groups per molecule thereof.

4. An aqueous composition according to claim 3 wherein said epoxy resin comprises a reaction product of a bisphenol and an epihalohydrin.

5. An aqueous composition according to claim 4 wherein said epoxy resin is characterized by an epoxy equivalent weight not greater than about 250.

6. An aqueous composition according to claim 5 wherein said organosilane is a haloalkylsilane or a glycidoxyalkylsilane or a mixture thereof.

7. An aqueous composition according to claim 6 wherein said organosilane is 3-chloropropyltrimethoxysilane or 3-glycidoxypropyltrimethoxysilane or a mixture thereof.

8. A glass fiber having as a size coating a dried residue of an aqueous sizing composition according to claim 1.

9. A resinous article reinforced with a glass fiber of claim 8 imbedded in the matrix resin thereof.

10. An article according to claim 9 wherein the matrix resin is an epoxy resin.

11. An article according to claim 10 wherein said article is fabricated by filament winding of essentially continuous multi-filament strands of said glass fiber.

* * * * *